United States Patent [19]
Northdurft et al.

[11] Patent Number: 4,912,968
[45] Date of Patent: Apr. 3, 1990

[54] METHOD FOR ADJUSTING A TRAVEL TRANSDUCER

[75] Inventors: Heinz Northdurft, Stuttgart; Karl-Friedrich Ruesseler; Wolfgang Braun, both of Ditzingen; Wolfram von Huelsen, Tuebingen, all of Fed. Rep. of Germany

[73] Assignee: Robert Bosch GmbH, Stuttgart, Fed. Rep. of Germany

[21] Appl. No.: 327,441

[22] Filed: Mar. 22, 1989

[30] Foreign Application Priority Data

Mar. 30, 1988 [DE] Fed. Rep. of Germany ....... 3810853

[51] Int. Cl.⁴ .......................................... G01M 15/00
[52] U.S. Cl. .................................................. 73/119 A
[58] Field of Search ............. 73/1 R, 119 A; 123/343; 338/13

[56] References Cited

U.S. PATENT DOCUMENTS

| | | | |
|---|---|---|---|
| 3,854,464 | 12/1974 | Reinhard | 123/343 |
| 4,192,272 | 3/1980 | Lang et al. | 123/343 |
| 4,353,340 | 10/1982 | Straubel et al. | 123/367 |
| 4,557,140 | 12/1985 | McFarland | 73/119 A |

Primary Examiner—Robert R. Raevis
Attorney, Agent, or Firm—Edwin E. Greigg

[57] ABSTRACT

Motor vehicle components that function in accordance with the operating state of a fuel injection pump require a load signal from the pump that represents an accurate quantity relationship, so that they can function in a properly adapted manner. The accurate quantity relationship is attained in that initially, by mechanical means, two additional stops, temporarily lengthened by a spacer gauge, on the pump limit the rotation of an adjusting lever. The conversion into an electrical signal is effected via a potentiometer coupled to the adjusting lever, the characteristic curve of the potentiometer being effected in such a way, in a calibration process by means of laser trimming of two compensating resistors connected in series with the potentiometer, that the set-point voltages with which predetermined quantities are associated are attained at both stops. This reference voltage is suitable for triggering succeeding components of the fuel injection pump.

10 Claims, 2 Drawing Sheets

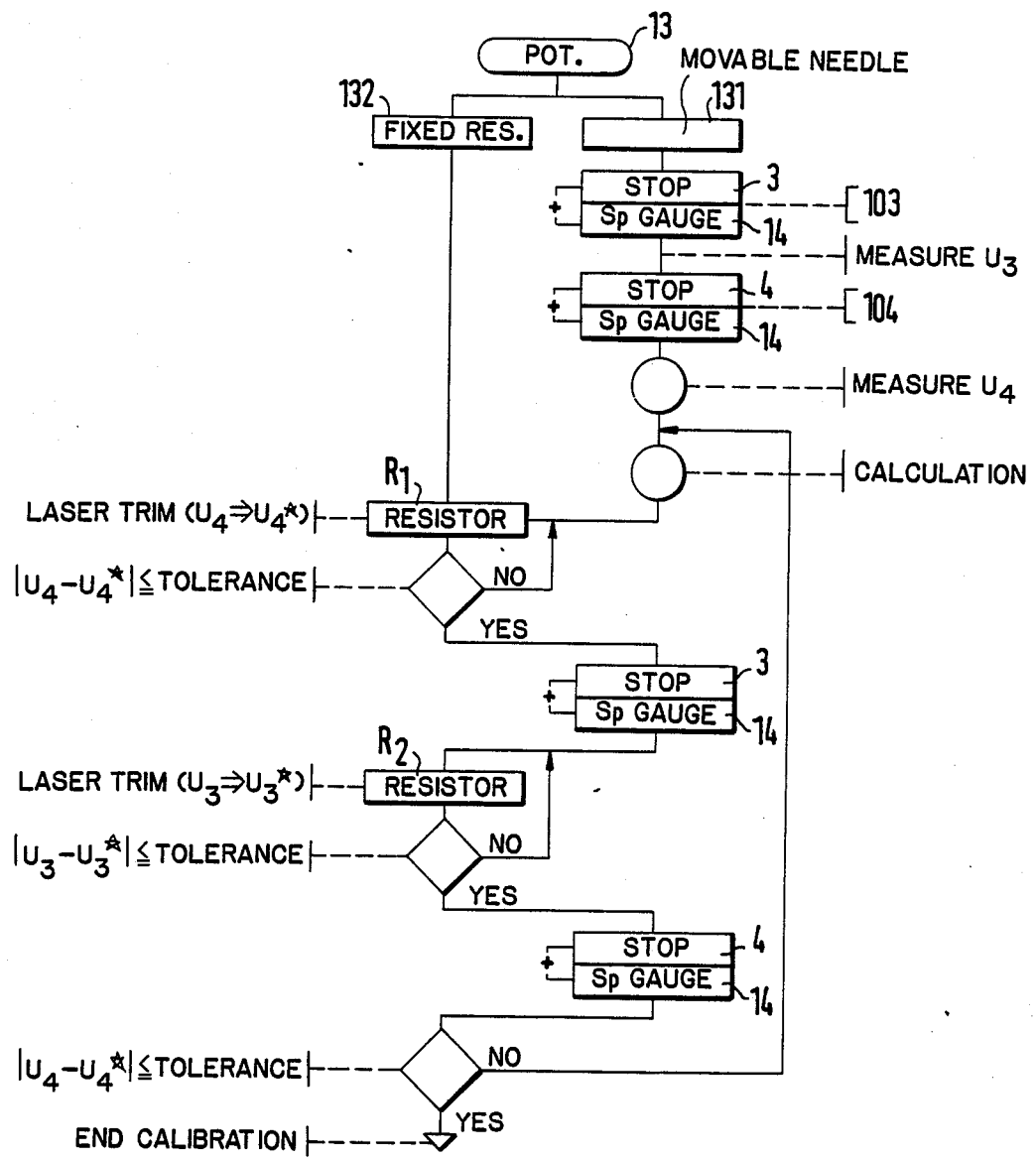

METHOD FOR ADJUSTING A TRAVEL TRANSDUCER

BACKGROUND OF THE INVENTION

The invention is based on a method for adjusting a travel transducer.

German Offenlegungsschrift No. 33 39 077 which is substantially the same as U.S. Pat. No. 4,559,816 discloses transmitting the position of a fuel injection pump control device to a potentiometer, the wiper voltage of which then defines the position of the control device. In this method, a travel transducer disclosed in this way is adjusted by displacing the potentiometer itself and by mechanically adjusting a compensating resistor while the fuel injection pump is operating. This calibration procedure is too laborious for mass production purposes, being performed with the aid of mechanically actuated adjusting element, which on the one hand are hard to reach because they are disposed inside a housing and on the other hand, because of the mechanical adjustment, have a fundamental hysteresis in adjusting play, and has the disadvantage, after the calibration process, of producing a reference voltage that is no longer constant enough for present-day standards of precision needed for economical production.

OBJECT AND SUMMARY OF THE INVENTION

The method according to the invention has an advantage over the prior art that the adjustment of the travel transducer can be done on a preset fuel injection pump that is not in operation and mounted on an operation test bench wherein the presetting is replicable because the positions of the adjusting part are marked.

The apparatus for performing the method has an advantage over the prior art that by means of additional stops, which are adjusted with a spacer gauge, operating points that represent a load signal having a precise quantity relationship that is the same for all pumps are indicated in a performance graph of the fuel injection pump. The requisite adaptation of the characteristic curve of the travel transducer for any fuel injection pump is done in a control circuit, largely without mechanical aids, and thus improves the replicability of the characteristic curve values and hence the quantity relationship.

The compensating resistors are built in in the stationary part of the travel transducer in such a way that they are readily accessible through a closable opening. The required resistances attained by burning off part of the resistor track with a laser beam are stably fixed.

This kind of calibration lends itself readily to automation; more than one calibration cycle can also be performed before dropping below a predetermined threshold of precision. There is no longer the danger of a subjective adjustment, with the attendant adjustment play hysteresis of mechanical adjusting elements.

The invention will be better understood and further objects and advantages thereof will become more apparent from the ensuing detailed description of a preferred embodiment taken in conjunction with the drawings.

BRIEF DESCRIPTION OF THE DRAWINGS

FIG. 3 is a flow chart illustrating the calibration method.

DESCRIPTION OF THE PREFERRED EMBODIMENT

Figure 1:
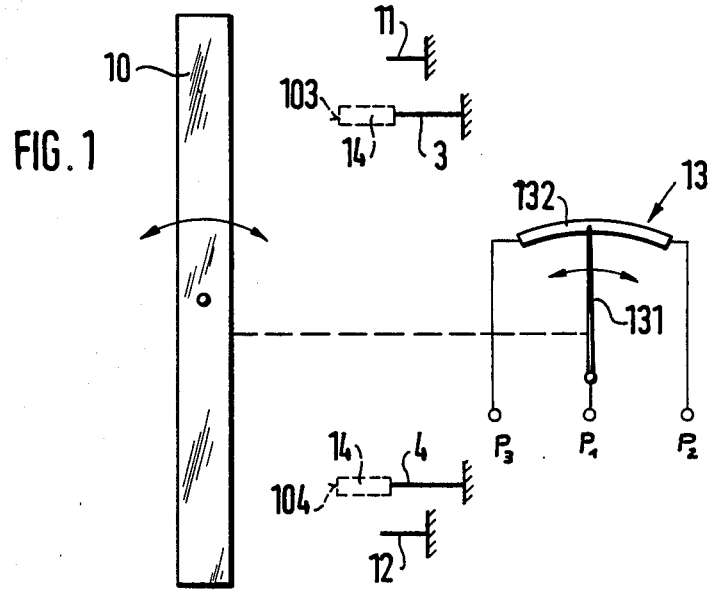
FIG. 1 is a schematic view of the apparatus.

FIG. 1 is a side view of a fuel injection pump of the distributor type, with a control element in the form of an adjusting lever 10 that controls the fuel injection quantity; in a known manner, the lever 10 engages the fuel injection pump governor, for instance arbitrarily controlling an initial tension of the governor spring. This adjusting lever 10 is pivotable between two stationary, adjustable stops 11 and 12 on the fuel injection pump: the stop 11 for the full-load operating point and the stop 12 for the idling operating point. The motion of the adjusting lever 10 is transmitted to a travel transducer 13 coupled to the fuel injection pump. The travel transducer 13 may operate by various principles; for example, it may be embodied as an inductive, capacitive or resistance transducer. In the ensuing description, a resistance transducer is assumed by way of example, since the motion of the adjusting lever is rotational, the transducer is in the form of a rotary potentiometer 13. The rotary potentiometer 13 is rotatably secured to the fuel injection pump by means of detachable fasteners, which allows both presetting of the fixed resistor 132 with respect to the rotational position of the adjusting lever 131 and a removal of a portion of either end or both ends of the fixed resistor for balancing out of tolerances among the various parts.

Figure 2:
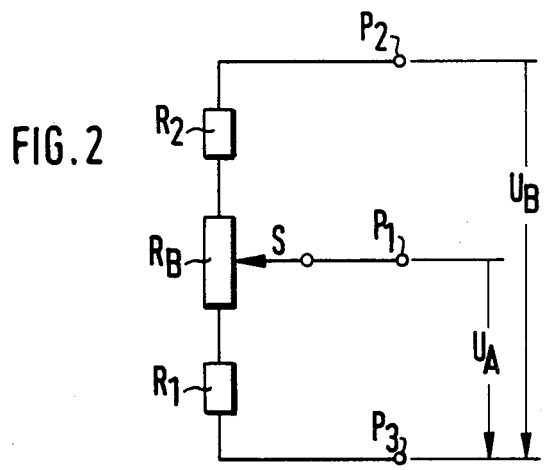
FIG. 2 is a circuit diagram for the potentiometer at the movable part of the transducer.

Besides the stops 11 and 12, two additional stops 3 and 4 are attached in a stationary but adjustable manner to the fuel injection pump, either beside the pivoting plane in the pivoting zone, or as will be described below in the pivoting plane outside the pivoting zone, with respect to the adjusting lever 10 such adjustable stops are shown in U.S. Pat. No. 4,353,340. The stops 3 and 4 may be made to act on both the potentiometer 13 and the adjusting lever 10 due to movement of the adjusting lever relative to the stops 3 and 4; the stops 3 and 4 are moved with auxiliary aids, in the present case a spacer gauge 14, which when mounted on the stops 3 and 4 located outside the pivoting zone cause the stops 3 and 4 to be lengthened by the length of the spacer gauge 14 which is moved temporarily, during the calibration process, into the pivoting range of the adjusting lever 10, in which case the spacer gauges 14 then embody the transformation stops 103 and 104. As a result, two positions and hence two operating points in a fuel pump performance graph of the injection quantity related to rpm, or in short the governor performance graph are determined. By coupling the adjusting lever 10 to the movable part 131 of the travel transducer 13, represented by the shaft and the wiper S of the potentiometer 13, this wiper S, shown in FIG. 2, is rotatable on a resistor track $R_B$, in accordance with the coupling ratio, by an equal or changed angular amount, which is predetermined by movement of the lever 10 to the two transformation stops 103 and 104. The resistor track $R_B$, two compensating resistors $R_1$ and $R_2$, and the potentiometer housing embody the fixed part 132 of the travel transducer 13. The resistor track $R_B$, as shown in FIG. 2, is connected symmetrically with the compensating resistors $R_1$ and $R_2$ in a series circuit. The ends of the compensating resistors remote from $R_B$ form connection points—that is, point $P_3$ for $R_1$ and point $P_2$ for $R_2$. The wiper S of the movable part 131 of the travel transducer 13 that slides over $R_B$ has the connection point $P_1$ at its end remote from the resistor track $R_B$. The operating voltage $U_B$, which is equivalent to the supply voltage $U_V$, is applied between the connection points $P_2$ and $P_3$. Depending on the position of the wiper S on the resistor track $R_B$, a variably high output voltage $U_A$ can be picked up between the connection points $P_1$ and $P_3$. In the governor performance graph of the fuel injection pump, this output voltage represents a particular fuel quantity for rpm as rpm is increased or decreased. Within the zone between the two transformation stops 103 and 104, the association of the rotational angle at the potentiometer 13 with the fuel quantity is dependent on the pump type. This dependency is eliminated by the method for adjusting the travel transducer 13, or calibration process.

FIG. 3 is a block diagram that schematically shows element of the calibration process. Beginning with an operational fuel injection pump mounted on the operation test bench, the stops 3 and 4 are lengthened by mounting on them the spacer gauge 14. The result is the transformation stops 103 and 104. The adjusting lever 10 is moved into position successively against the stops 103 and 104, and the stop 3 is thereby adjusted such that when the adjusting lever 10 is in contact with the transformation stop 103 a predetermined reference point located near the full-load zone in the governor performance graph is reached, and when the adjusting lever 10 is in contact with the transformation stop 104 the stop 4 is adjusted to a predetermined reference point when the lower idling range in the performance graph is reached. The stops 3 and 4 are fixed and now directly embody the stops for the adjusting lever 10. After premounting the potentiometer 13 on the fuel injection pump and electrically connecting the potentiometer 13, the fuel injection pump is preset, in the sense of the ensuing calibration process as described in FIG. 3, which is performed on a measuring test bench with the fuel injection pump not in operation.

The adjusting lever 10 is moved into a previously determined position, in the case shown in FIG. 3 to the transformation stop 103. By rotating the housing of the potentiometer 13 and hence the resistor track $R_B$, the wiper S coupled with the adjusting lever 10 is displaced on $R_B$ until a predetermined voltage $U_1$ is attained as an output voltage $U_A$ between the connection points $P_1$ and $P_3$. In this position, the housing of the potentiometer 13 is durably fixed, and the basic setting of the potentiometer 13 is thus completed. After that, the actual voltage $U_3$ is measured between the connection points $P_1$ and $P_3$.

Next, the adjusting lever 10 is rotated into the second previously determined position, in the case shown in FIG. 3 to the transformation stop 104. The wiper S follows this rotation on the now-stationary resistor track $R_B$. The actual voltage $U_4$ can thus be picked up as an electrical adjusting signal between points $P_1$ and $P_3$. The two electrical adjusting signals, in the form of the actual voltages $U_3$ and $U_4$, are compared with predetermined set-point signals in the form of set-point voltages $U_3^*$ and $U_4^*$; signal deviations between voltage $U_3$ and $U_3^*$ and between $U_4$ and $U_4^*$ are ascertained, and correction values are calculated from the deviations. These correction valves are converted by means of laser trimming, that is, with a laser device the beam burns off portions of the compensating resistors $R_1$ and $R_2$, thus changing their resistance to produce the previously predetermined set-point signals.

The calibration process is completed whenever, after this first calibration cycle, and after the adjusting lever 10 has been moved to the transformation stops 103 and 104, the deviations between the actual voltages $U_3$ and $U_4$ from the set-point voltages $U_3^*$ and $U_4^*$ are within a predetermined tolerance range. If this has not yet occurred, then a further calibration cycle is initiated. Once the calibration process is completed, the spacer gauge 14 is removed; the calibration opening of the potentiometer is closed with a cap, and thus the outcome of compensation of various influences is kept from affecting the resistor circuit in the potentiometer 13.

Standardized control voltages that are located on a predetermined curve are now available between the positions defined by the previously defined transformation stops 103 and 104 at the connection points $P_1$ and $P_3$. With this standardized control voltage, which because of the calibration process represents a constant, precise quantity relationship, it is possible for automatic transmissions, exhaust gas recirculation valves, or mechanical charges, for instance, to be triggered in such a way that on the one hand the high precision standards required nowadays can be met in a constant manner from one pump to another. The process is attained on a fuel injection pump that is not in operation, as part of a production process that can be economically performed.

The foregoing relates to a preferred exemplary embodiment of the invention, it being understood that other variants and embodiments thereof are possible within the spirit and scope of the invention, the latter being defined by the appended claims.

What is claimed and desired to be secured by Letters Patent of the United States is:

1. A method for adjusting a travel transducer (13) of a fuel injection pump which emits control signals to an electric control unit in accordance with the positions of a control element (10) which controls fuel injection quantities in a fuel supply system for internal combustion engines, which comprises mounting an operational fuel injection pump on an operation test bench, moving the control element (10) to approach at least two operating points which correspond to different fuel injection quantities in a fuel injection pump performance graph for injecting a set fuel quantity corresponding to a particular rpm, indicating positions of the control element (10) in accordance with said at least two operating points, transmitting said indicated positions to a movable part (132) of said tavel transducer; deriving electrical control signals from a supply voltage picked up by the travel transducer (13) at said at least two points; comparing the control signals with set-point signals predetermined by two operating points; and correcting a basic setting of the travel transducer (13) as a function of a signal deviation between said set-point signals and said derived signals in the fuel injection quantity control device to obtain a basic setting.

2. A method as defined by claim 1, in which said travel transducer (13) is a potentiometer including a first resistor on its input side and a second resistor on its output side, and varying the basic setting by varying a resistance value of said first resistor on the input side and/or said second resistor on the output side of said potentiometer.

3. A method as set forth in claim 2, which includes the step of balancing the resistance values of said input and output resistors.

4. A method as set forth in claim 3, in which a laser is used to trim said resistors during balancing to reduce the resistance value.

5. An apparatus for adjusting a travel transducer of a fuel injection pump which emits control signals to an electric control unit in accordance with the positions of an adjusting lever (10) disposed on the outside of said fuel injection pump, said adjusting lever is connected on the inside of the fuel injection pump with a fuel governor, said adjusting lever is pivotable between a full-load stop (11) and an idling stop (12) and is coupled with a movable part (131) of said travel transducer (13), said travel transducer has an arrangement for varying a basic setting, at least two additional adjustable stops (3, 4) are provided in or beside a pivoting transducer (13) or of said adjusting lever (10), each of said adjustable stops (3, 4) are provided with a spacer gauge (14) which are transmittable into the pivoting range or pivoting plane to the movable part (131) of the travel transducer (13) or to the adjusting lever (10), to establish operating points which are indicated on said fuel injection pump.

6. An apparatus as defined by claim 5, in which said travel transducer is a potentiometer (13) which includes compensating resistors which are built in in a stationary part (132) of said potentiometer.

7. An apparatus as defined by claim 6, in which said potentiometer (13) is a rotary potentiometer housed in a housing which includes a calibration opening, which is closable subsequent to adjusting said rotary potentiometer.

8. An apparatus as defined by claim 5, in which said compensating resistors are balanced by laser trimming.

9. An apparatus as defined by claim 8, in which said potentiometer (13) is a rotary potentiometer housed in a housing which includes a calibration opening, which is closable subsequent to adjusting said rotary potentiometer.

10. An apparatus as defined by claim 5, in which said potentiometer (13) is a rotary potentiometer housed in a housing which includes a calibration opening, which is closable subsequent to adjusting said rotary potentiometer.

* * * * *